US006778355B2

(12) United States Patent
Hasegawa et al.

(10) Patent No.: US 6,778,355 B2
(45) Date of Patent: Aug. 17, 2004

(54) GLASS COMPOSITION, SEALING GLASS FOR MAGNETIC HEAD AND MAGNETIC HEAD USING THE SAME

(75) Inventors: Shinya Hasegawa, Ibaraki (JP); Mikie Kanai, Moriguchi (JP); Hideo Torii, Higashiosaka (JP); Tetsuya Kamimoto, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 251 days.

(21) Appl. No.: 10/030,048

(22) PCT Filed: May 1, 2001

(86) PCT No.: PCT/JP01/03780

§ 371 (c)(1),
(2), (4) Date: Jan. 8, 2002

(87) PCT Pub. No.: WO01/85631

PCT Pub. Date: Nov. 15, 2001

(65) Prior Publication Data

US 2003/0048580 A1 Mar. 13, 2003

(30) Foreign Application Priority Data

May 11, 2000 (JP) ........................................ 2000-138954
May 11, 2000 (JP) ........................................ 2000-138955

(51) Int. Cl.$^7$ ............................ G11B 5/127; C03C 3/066
(52) U.S. Cl. ........................... 360/125; 360/119; 501/79
(58) Field of Search ................................ 360/119, 120, 360/125; 501/17, 20, 21, 51, 53, 73, 77, 78, 79; 427/162, 165, 376.2; 428/426, 427, 428, 432, 469, 472

(56) References Cited

U.S. PATENT DOCUMENTS

| 5,252,521 A | | 10/1993 | Roberts |
| 5,273,948 A | * | 12/1993 | Yamazaki et al. ............ 501/75 |
| 5,326,591 A | | 7/1994 | Roberts |
| 5,675,460 A | * | 10/1997 | Watanabe et al. ........... 360/120 |
| 5,708,544 A | * | 1/1998 | Kawashima et al. ........ 360/119 |
| 5,905,612 A | * | 5/1999 | Honma et al. ............... 360/119 |
| 5,932,504 A | * | 8/1999 | Terashima et al. ............ 501/75 |

FOREIGN PATENT DOCUMENTS

| JP | 4-37626 A | 2/1992 |
| JP | 4-37627 | 2/1992 |
| JP | 8-59294 | 3/1996 |
| JP | 9-268026 A | 10/1997 |
| JP | 9-278483 A | 10/1997 |

OTHER PUBLICATIONS

Machine translation of Japanese document 09–278483, Oct. 28, 1997.*

* cited by examiner

Primary Examiner—David Ometz
(74) Attorney, Agent, or Firm—McDermott Will & Emery LLP

(57) ABSTRACT

In order to provide a practically lead-free glass composition having a low softening point and an excellent water resistance for use in various parts of electronic equipment and a magnetic head using the same, a glass composition is provided, which contains 0.5 to 14 wt % of $SiO_2$, 3 to 15 wt % of $B_2O_3$, 4 to 22 wt % of ZnO, 55 to 90 wt % of $Bi_2O_3$, 0 to 4 wt % of $Al_2O_3$, 0 to 5 wt % of at least one selected from the group consisting of $Li_2O$, $Na_2O$ and $K_2O$, and 0 to 15 wt % of at least one selected from the group consisting of MgO, CaO, SrO and BaO.

10 Claims, 3 Drawing Sheets

GLASS COMPOSITION, SEALING GLASS FOR MAGNETIC HEAD AND MAGNETIC HEAD USING THE SAME

TECHNICAL FIELD

The present invention relates to a glass composition having a low softening point which is used as a bonding material, sealing material, coating material for materials such as ceramics, glass and metal, or as a paste material and the like.

The present invention also relates to a magnetic head suitable for recording and reproducing magnetic information on a magnetic recording medium, and to a sealing glass for bonding a pair of magnetic core halves constituting such a magnetic head.

BACKGROUND ART

In various parts used for electronic equipment, different glass materials are used as the materials for bonding, sealing or coating a variety of components each comprising ceramics, glass, metal or the like. These materials are used in various forms such as a bulk, powder, fiber and thin film, either as a material consisting only of glass or as a composite material comprising a glass material and other materials. Also used in a variety of applications is a paste material imparted various functions, which is obtained by mixing a glass material as a glass frit with some other material and a suitable filler, vehicle or the like.

One exemplary application of a glass material in the above-described purpose is a magnetic head, which records and reproduces magnetic information on a magnetic recording medium. In a magnetic head, a glass material is used for bonding a pair of magnetic core halves to form a magnetic gap. Such a glass material is generally called a sealing glass, and represents an important component which exerts influence even on the performance of a magnetic head.

In the following, conventional magnetic heads will be described.

Ferrite is widely used as core materials for magnetic heads because of its superior magnetic property, abrasion resistance, machinability and the like. A magnetic head called a ferrite head is obtained by butting against each other a pair of magnetic core halves each comprising ferrite, at least one of which is formed with a groove for a coil, with a magnetic gap material comprising a non-magnetic material interposed therebetween, and bonding the core halves together with a sealing glass.

Further, with the recent realization of miniaturization and high capacity for magnetic recording and reproducing devices, magnetic recording media having a high coercive force have been increasingly used. As a high-density magnetic head for magnetic recording which is capable of sufficiently writing signals on such media, improved versions of the above-described ferrite head have been developed.

Among them, a magnetic head called a metal in gap (MIG) head is obtained by coating a pair of magnetic core halves at gap-facing surfaces thereof with a magnetic metal film having a high saturation magnetic flux density (e.g., a thin film of a magnetic metal material such as Fe—Ta—N, Fe—Nb—N, Fe—Nb—Si—B—N, Fe—Ta—C, Co—Ta—Zr—Nb or Co—Nb—Zr—N. Hereinafter referred to as "a magnetic metal film."), butting the pair of magnetic core halves against each other with a magnetic gap material interposed therebetween, and bonding the core halves together with a sealing glass.

Also, a magnetic head called a laminated head is obtained by butting each other a pair of magnetic core halves, each of which is constituted by sandwiching a metal magnetic film between non-magnetic substrates, with a magnetic gap material interposed therebetween at the ends of the magnetic metal films of the core halves, and bonding the core halves together with a sealing glass.

In recent years, with the increasing demand for the realization of high performance and high reliability for electronic equipment and various parts, including the above-described magnetic heads, the requirements for the glass materials used in the purpose discussed above have become more severe.

These glass materials need to be subjected to a suitable heat treatment when used, and it is required that a temperature for the heat-treatment be as low as possible in order to prevent materials other than the glass material, parts containing a glass material and equipment containing a glass material from being degraded due to heat. As a glass material in compliance with such requirement, a so-called glass having a low softening point is used.

Meanwhile, the coefficient of thermal expansion of a glass material, in general, tends to increase with a decrease in the softening point of the glass material. Then, in order to prevent a fracture and a crack due to the distortion occurred after cooling, it is required to decrease the coefficient of thermal expansion. Furthermore, in the case of the above-described magnetic heads, for example, it is necessary to control the distortion in order to realize an optimum magnetic recording property and, therefore, glass materials having suitable coefficients of thermal expansion depending on the specifications of the respective magnetic heads are demanded.

Accordingly, these glass materials are required to have suitable temperature characteristic and coefficient of thermal expansion depending on their respective uses. More specifically, glass materials used in the recent electronic equipment and various parts are required to have a working temperature of from 450° C. to 650° C. and a coefficient of thermal expansion of from $70 \times 10^{-7}$ to $130 \times 10^{-7}/°$ C. The working temperature used herein means a temperature at which the viscosity of a glass material becomes $10^3$ Pa·s. Also, the softening point means a temperature determined by the measurement by the testing method JIS R 3104, that is, a temperature at which the viscosity of a glass material becomes $10^{6.6}$ Pa·s. Except for glass materials exhibiting a special viscosity behavior, the working temperature of a glass material tends to decrease with a decrease in its softening point.

Heretofore, lead glasses of $SiO_2$—$B_2O_3$—$PbO$ type, $B_2O_3$—$PbO$—$ZnO$ type and the like have been used as glasses having a low softening point, and the addition of lead has been essential for realizing a low softening point.

However, the conventionally used glasses having a low softening point including lead glasses are not sufficient, especially in terms of water resistance, to be used for the recent electronic equipment and various parts each having even higher performance and higher reliability.

In particular, with the increasing demand for the realization of higher performance and higher reliability, a magnetic head is occasionally exposed to a grinding fluid or the like for a long time during the processing step, resulting in a problem of eroding the sealing glass. In other words, the chemical durability of the sealing glass has often posed problems.

Additionally, the glass materials used in such purpose have been required to be lead-free.

In order to solve the above-described problem in the prior art, it is an object of the present invention to provide a glass composition having a low softening point and an excellent water resistance despite being lead-free. It is another object of the present invention to provide a sealing glass for a magnetic head comprising the above glass composition, and a magnetic head using the same.

DISCLOSURE OF INVENTION

In order to solve the foregoing problem, the present invention provides a glass composition containing 0.5 to 14 wt % of $SiO_2$, 3 to 15 wt % of $B_2O_3$, 4 to 22 wt % of ZnO, 55 to 90 wt % of $Bi_2O_3$, 0 to 4 wt % of $Al_2O_3$, 0 to 5 wt % of at least one selected from the group consisting of $Li_2O$, $Na_2O$ and $K_2O$. and 0 to 15 wt % of at least one selected from the group consisting of MgO, CaO, SrO and BaO. Herein, the content of each component in the above glass composition was expressed in terms of an oxide.

The present invention also provides a sealing glass for a magnetic head comprising the above glass composition.

The present invention also provides a magnetic head comprising: a magnetic core halves butted against each other with a magnetic gap material interposed therebetween, at least one of which is provided with a groove for a coil; and the above sealing glass for a magnetic head that bonds the core halves.

The present invention further provides a magnetic head comprising: a pair of magnetic core halves butted against each other with a magnetic gap material interposed therebetween at gap-facing surfaces of the core halves, at least one of which is provided with a groove for a coil and at least one of which is formed with a magnetic metal film on the gap-facing surface; and the above sealing glass for a magnetic head that bonds the core halves together.

Further, the present invention provides a magnetic head comprising: a pair of magnetic core halves butted against each other with a magnetic gap material interposed therebetween at ends of magnetic metal films of the core halves, each of which is constituted by sandwiching the magnetic metal film between non-magnetic substrates and at least one of which is provided with a groove for a coil; and the above sealing glass for a magnetic head that bonds the core halves together.

BEST MODE FOR CARRYING OUT THE INVENTION

Figure 1:
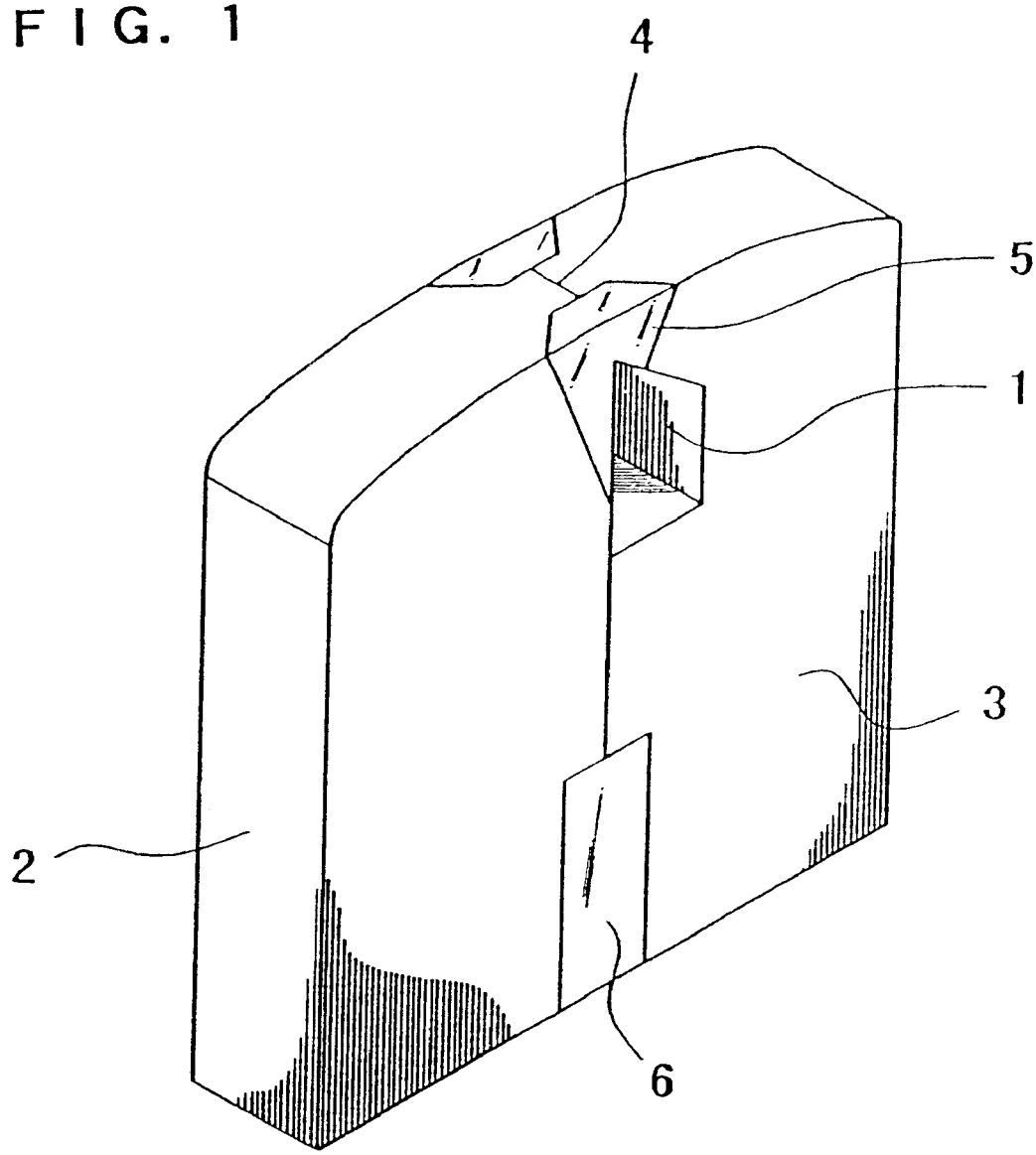
FIG. 1 is a perspective view of a ferrite head as one example in accordance with the present invention.

In order to obtain a lead-free glass material having a low softening point, it is necessary to use a component having the function of lowering the softening point and working temperature, in place of an oxide of lead. The present invention provides a glass composition mainly composed of an oxide of bismuth, which has a working temperature of from 450° C. to 650° C., a coefficient of thermal expansion of from $70 \times 10^{-7}$ to $130 \times 10^{-7}/°$ C. and an excellent water resistance.

The above glass composition contains, in terms of an oxide, 0.5 to 14 wt % of $SiO_2$, 3 to 15 wt % of $B_2O_3$, 4 to 22 wt % of ZnO, 55 to 90 wt % of $Bi_2O_3$, 0 to 4 wt % of $Al_2O_3$, 0 to 5 wt % of at least one selected from the group consisting of $Li_2O$, $Na_2O$ and $K_2O$, and 0 to 15 wt % of at least one selected from the group consisting of MgO, CaO, SrO and BaO.

The following is the reason why the content ranges of the respective components were limited as above.

When the $SiO_2$ content is less than 0.5 wt %, a stable glass cannot be obtained, or alternatively, when it is more than 14 wt %, the working temperature exceeds 650° C.; therefore, the content is preferably from 0.5 to 14 wt %.

Further, when the $SiO_2$ content is high, a crystal is prone to precipitate in the glass; therefore, the content is more preferably from 0.5 to 12 wt % in order to reduce this.

When the $B_2O_3$ content is less than 3 wt %, the coefficient of thermal expansion increases, or alternatively, when it is more than 15 wt %, a stable glass cannot be obtained; therefore, the content is preferably from 3 to 15 wt %.

Further, when the $B_2O_3$ content is high, a crystal is prone to precipitate in the glass; therefore, the content is preferably from 3 to 9 wt % in order to reduce this.

When the ZnO content is less than 4 wt %, the water resistance deteriorates, or alternatively, when it is more than 22 wt %, a stable glass cannot be obtained; therefore, the content is preferably from 4 to 22 wt %.

Further, when the ZnO content is high, a crystal is prone to precipitate in the glass; therefore, the content is preferably from 4 to 19 wt % in order to reduce this.

Further, in order to obtain a more stable glass, the weight ratio of ZnO and $B_2O_3$ ($ZnO/B_2O_3$) is preferably from 0.8 to 2.8.

When the $Bi_2O_3$ content is less than 55 wt %, the working temperature exceeds 650° C., or alternatively, when it is more than 90 wt %, a stable glass cannot be obtained; therefore, the content is preferably from 55 to 90 wt %.

Further, when the $Bi_2O_3$ content is high, a crystal is prone to precipitate in the glass; therefore, the content is more preferably from 55 to 85 wt % in order to reduce this.

Although $Al_2O_3$ is not necessarily an essential component, it has the functions of accelerating vitrification and improving water resistance. However, when its content is more than 4 wt %, the working temperature exceeds 650° C.; therefore, the content is preferably from 0 to 4 wt %.

Further, in order to obtain a more stable glass, the weight ratio of $SiO_2$ and $Al_2O_3$ ($SiO_2/Al_2O_3$) is preferably not less than 2.0.

Although $Li_2O$, $Na_2O$ and $K_2O$ are not necessarily essential components, the addition of at least one of them allows the working temperature to decrease. However, when their contents exceed 5 wt %, the coefficient of thermal expansion increases and the water resistance deteriorates; therefore, the contents are preferably from 0 to 5 wt %.

Further, when their contents are high, a crystal is prone to precipitate in the glass; therefore, the contents of $Li_2O$, $Na_2O$ and $K_2O$ are preferably from 0 to 2 wt %, 0 to 3 wt % and 0 to 4 wt %. respectively, and further, the total of the contents is preferably from 0 to 4 wt %.

Although MgO, CaO, SrO and BaO are not necessarily essential components, the addition of at least one of them provides a stable glass. However, when their contents exceed 15 wt %, vitrification is difficult to proceed; therefore, the contents are preferably from 0 to 15 wt %.

Further, when their contents are high, a crystal is prone to precipitate in the glass; therefore, the contents of MgO, CaO, SrO and BaO are 0 to 6 wt %, 0 to 8 wt %, 0 to 10 wt % and 0 to 12 wt %, respectively, and further, the total of the contents is preferably from 0 to 12 wt %.

Any component other than the above can be added for the purpose of a certain type of modification, as far as the effect of the present invention is not impaired.

Magnetic heads in accordance with the present invention each using a sealing glass comprising the above glass composition will be described in detail in the examples, which will be discussed later.

In the following, the present invention will be specifically described with reference to examples; however, the present invention is not limited to these examples.

EXAMPLES 1 TO 30

Glass compositions 1 to 30 having the respective compositions listed in Tables 1 to 3 were produced as examples of the glass composition in accordance with the present invention.

After predetermined raw materials were prepared and mixed, the obtained mixture was placed in a platinum crucible to be molten in an electric furnace at 900° C. to 1300° C. for 1 hour. Subsequently, the molten glass thus obtained was rapidly cooled by means of a roller to produce each of the glass compositions in accordance with the present invention. The composition, working temperature, coefficient of thermal expansion and water resistance of each of the resultant glass compositions were shown in Tables 1 and 2.

The working temperature, coefficient of thermal expansion and water resistance shown here were evaluated as follows.

First, the working temperature was evaluated by measuring the viscosity of each molten glass to determine a temperature at which the viscosity became $10^3$ Pa·s and regarding this as the working temperature.

The coefficient of thermal expansion was evaluated by producing a glass rod with a diameter of 4 mm and a length of 20 mm from each of the resultant glass compositions, and measuring the coefficient of linear expansion thereof while increasing the temperature at 10° C./min to calculate the average coefficient of thermal expansion at 30° C. to 300° C.

The water resistance was evaluated by producing a cubic sample with a side of 10 mm from each of the resultant glass compositions, and immersing this sample in a boiling ion exchange water for one hour to determine the weight loss per unit area. In order for a glass composition to be used for various components or the like, this value is preferably not more than 1.0 mg/cm$^2$.

TABLE 1

| No. | | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Composition (wt %) | $SiO_2$ | 6.8 | 4.8 | 4.1 | 3.5 | 9.6 | 2.1 | 3.4 | 9.3 | 2.1 | 0.6 | 2.0 | 1.2 | 10.7 | 13.0 | 10.5 |
| | $B_2O_3$ | 12.8 | 9.9 | 6.9 | 5.3 | 8.7 | 3.7 | 6.6 | 7.0 | 6.1 | 5.1 | 3.5 | 6.7 | 8.6 | 7.0 | 9.6 |
| | ZnO | 14.6 | 9.9 | 11.5 | 18.7 | 16.7 | 8.7 | 9.2 | 14.4 | 8.6 | 5.5 | 12.5 | 7.8 | 20.3 | 14.5 | 18.3 |
| | $Bi_2O_3$ | 65.8 | 75.4 | 76.9 | 71.5 | 63.8 | 82.6 | 78.9 | 67.2 | 82.1 | 87.6 | 81.0 | 80.3 | 57.9 | 64.2 | 58.2 |
| | $Al_2O_3$ | — | — | 0.6 | 1.0 | 1.2 | 1.8 | 1.0 | 1.1 | — | — | — | 1.0 | 1.0 | 0.6 | 2.6 |
| | $Li_2O$ | — | — | — | — | — | 1.1 | 0.3 | 0.3 | — | — | — | — | — | — | — |
| | $Na_2O$ | — | — | — | — | — | — | 0.6 | 0.7 | 1.1 | 1.2 | 1.0 | 3.0 | 1.5 | 0.7 | 0.8 |
| | $K_2O$ | — | — | — | — | — | — | — | — | — | — | — | — | — | — | — |
| | MgO | — | — | — | — | — | — | — | — | — | — | — | — | — | — | — |
| | CaO | — | — | — | — | — | — | — | — | — | — | — | — | — | — | — |
| | SrO | — | — | — | — | — | — | — | — | — | — | — | — | — | — | — |
| | BaO | — | — | — | — | — | — | — | — | — | — | — | — | — | — | — |
| Working Temperature (° C.) | | 600 | 575 | 550 | 545 | 630 | 475 | 525 | 605 | 495 | 455 | 470 | 475 | 625 | 640 | 650 |
| Coefficient of thermal expansion (×10$^{-7}$/° C.) | | 75 | 94 | 93 | 85 | 76 | 106 | 102 | 84 | 112 | 130 | 124 | 125 | 80 | 80 | 76 |
| Wate resistance (mg/cm$^2$) | | 0 | 0.2 | 0.1 | 0.2 | 0 | 0.5 | 0.3 | 0.1 | 0.7 | 0.8 | 0.7 | 0.6 | 0.1 | 0 | 0 |

TABLE 2

| No. | | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|
| Composition (wt %) | $SiO_2$ | 5.0 | 4.7 | 3.4 | 3.4 | 3.5 | 5.3 | 5.7 | 3.4 | 3.1 | 3.4 | 2.9 | 3.3 | 4.0 | 3.3 | 2.6 |
| | $B_2O_3$ | 6.0 | 5.5 | 6.5 | 6.5 | 6.7 | 10.7 | 11.6 | 6.5 | 5.5 | 6.5 | 3.7 | 6.5 | 5.5 | 6.4 | 6.3 |
| | ZnO | 4.6 | 12.9 | 9.2 | 10.6 | 11.0 | 10.7 | 11.6 | 9.2 | 4.9 | 9.1 | 5.7 | 9.1 | 8.5 | 9.0 | 8.0 |
| | $Bi_2O_3$ | 80.9 | 73.7 | 78.7 | 78.0 | 76.6 | 71.2 | 66.6 | 78.5 | 81.5 | 78.4 | 81.6 | 77.7 | 72.9 | 77.0 | 70.9 |
| | $Al_2O_3$ | 1.5 | 2.0 | 1.0 | 0.9 | 1.0 | — | — | 1.0 | 0.8 | 1.0 | 1.1 | 0.9 | 1.0 | 0.9 | 0.9 |
| | $Li_2O$ | — | — | — | — | — | — | — | — | — | — | — | — | — | — | — |
| | $Na_2O$ | 2.0 | 1.2 | 1.2 | 0.6 | 1.2 | — | — | 0.6 | 1.2 | 0.6 | 1.1 | 0.6 | 0.4 | 0.6 | 0.2 |
| | $K_2O$ | — | — | — | — | — | 2.1 | 4.5 | — | — | — | — | — | — | — | — |
| | MgO | — | — | — | — | — | — | — | 0.8 | 3.0 | — | — | — | — | — | — |
| | CaO | — | — | — | — | — | — | — | — | — | 1.0 | 3.9 | — | — | — | — |
| | SrO | — | — | — | — | — | — | — | — | — | — | — | 1.9 | 7.7 | — | — |
| | BaO | — | — | — | — | — | — | — | — | — | — | — | — | — | 2.8 | 11.1 |

TABLE 2-continued

| No. | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|
| Working Temperature (° C.) | 520 | 545 | 515 | 530 | 530 | 590 | 600 | 535 | 510 | 530 | 475 | 530 | 520 | 530 | 520 |
| Coefficient of thermal expansion ($\times 10^{-7}/°$ C.) | 113 | 91 | 106 | 99 | 105 | 97 | 101 | 101 | 118 | 103 | 128 | 102 | 104 | 103 | 106 |
| Wate resistance (mg/cm$^3$) | 0.4 | 0.2 | 0.2 | 0.3 | 0.2 | 0.1 | 0.1 | 0.2 | 0.4 | 0.3 | 0.5 | 0.2 | 0.3 | 0.4 | 0.3 |

As shown in Tables 1 and 2, it was found that the sealing glasses in accordance with the present invention had a working temperature of from 450° C. to 650° C., a coefficient of thermal expansion of from $70\times10^{-7}$ to $130\times10^{-7}/°$ C. and an excellent water resistance despite being lead-free.

Additionally, the glass compositions produced as above are preferably amorphous when used, in terms of fluidity or the like. However, the glass compositions might be crystallized after the heat treatment, depending on the uses.

These glass compositions could also be used in the form of a bulk, powder, fiber, thin film or the like. They could be used in any other form. Each of the above glass compositions could be used either as a material consisting only of the glass composition or as a composite material comprising the glass composition and some other materials.

These glass compositions could be used for all types of applications, including various parts of electronic equipment, as a bonding material, sealing material and coating material for ceramics, glass, metal and the like, or a paste material having various functions, in place of conventionally used glass compositions. For example, they could be used for magnetic heads, various parts of LCRs, semiconductor packages, other electronic components, and display devices such as Braun tubes, liquid crystal display panels and plasma display panels. Moreover, they could be used for tubes and bulbs for lighting, enamel products, ceramic products and the like.

Comparative Examples 1 to 6

Glass compositions 31 to 37 having the respective compositions listed in Table 3 were produced as comparative examples of the glass composition in accordance with the present invention.

After predetermined raw materials were prepared and mixed, the obtained mixture was placed in a platinum crucible to be molten in an electric furnace at 900° C. to 1200° C. for one hour. Subsequently, the molten glass thus obtained was rapidly cooled by means of a roller to produce each of the glass compositions as the comparative examples. The composition, working temperature, coefficient of thermal expansion and water resistance of each of the resultant glass compositions were shown in Table 3. Here, they were evaluated in the same manner as in Example 1.

TABLE 3

| No. | | 31 | 32 | 33 | 34 | 35 | 36 | 37 |
|---|---|---|---|---|---|---|---|---|
| Composition (wt %) | SiO$_2$ | 0.7 | 1.5 | 9.9 | 3.0 | 16.5 | 15.2 | 23.5 |
| | B$_2$O$_3$ | 16.0 | 7.6 | 12.3 | 9.0 | 3.0 | 8.5 | 2.3 |
| | ZnO | 8.1 | 8.9 | 4.5 | 10.0 | 0.5 | 1.2 | 2.4 |
| | PbO | 73.7 | 78.6 | 70.4 | 74.0 | 79.5 | 68.5 | 65.3 |
| | Al$_2$O$_3$ | 0.5 | 0.4 | 1.6 | 1.0 | 0.5 | 4.7 | 3.2 |
| | Li$_2$O | — | — | — | — | — | — | — |
| | Na$_2$O | — | — | 1.3 | — | — | 1.9 | 3.3 |
| | K$_2$O | 0.7 | 1.9 | — | — | — | — | — |
| | MgO | — | — | — | — | — | — | — |
| | CaO | 0.3 | 1.1 | — | — | — | — | — |
| | SrO | — | — | — | — | — | — | — |
| | BaO | — | — | — | 3.0 | — | — | — |
| Working Temperature (° C.) | | 480 | 480 | 540 | 490 | 530 | 630 | 650 |
| Coefficient of thermal expansion ($\times 10^{-7}/°$ C.) | | 95 | 107 | 91 | 96 | 104 | 88 | 91 |
| Water resistance (mg/cm$^3$) | | 3.3 | 4.0 | 1.9 | 2.8 | 2.1 | 1.5 | 1.3 |

As shown in Table 3, it was found that the lead-containing glass compositions of the comparative examples had a poor water resistance, although they had a working temperature of from 450° C. to 650° C. and a coefficient of thermal expansion of from $70\times10^{-7}$ to $130\times10^{-7}/°$ C.

EXAMPLE 31

FIG. 1 shows a perspective view of a ferrite head as one example of a magnetic head in accordance with the present invention. A magnetic core half 2 comprising ferrite and a magnetic core half 3 comprising ferrite that was provided with a groove 1 for a coil were butted against each other with a magnetic gap material 4 interposed therebetween, and bonded together with sealing glasses 5 and 6.

The glass composition 8 produced in the above example was used as the sealing glasses 5 and 6, each of which was heat-treated at 605° C. to complete the fabrication of the ferrite head shown in FIG. 1.

Mn—Zn single crystal ferrite was used as the ferrite constituting the magnetic core halves 2 and 3, and fused silica was used as the magnetic gap material 4.

The fabricated ferrite head produced no crack or fracture, and no erosion or the like was observed in the sealing glass portion, thereby exhibiting a desired magnetic transducing characteristic.

EXAMPLE 32

Figure 2:
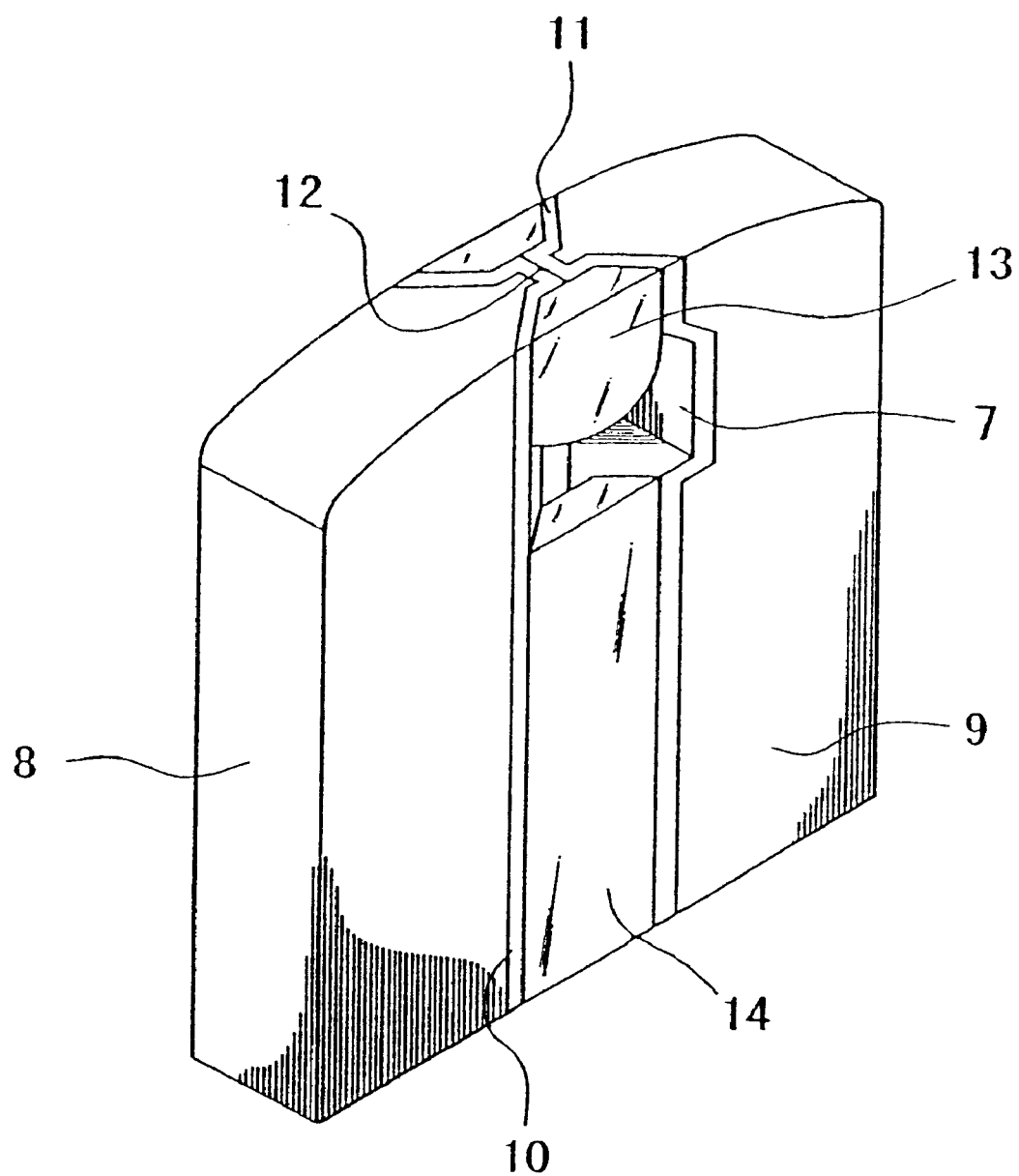
FIG. 2 is a perspective view of an MIG head as one example in accordance with the present invention.

FIG. 2 shows a perspective view of an MIG head as one example of a magnetic head in accordance with the present invention. At magnetic gap-facing surfaces of magnetic core halves 8 and 9, each of which comprised ferrite and was provided with a groove for a coil 7, magnetic metal films 10 and 11 were provided to form a magnetic gap material 12 between the magnetic metal films 10 and 11. The magnetic core halves 8 and 9 were bonded together with sealing glasses 13 and 14.

The glass composition 18 of the above example was used as the sealing glasses 13 and 14, each of which was heat-treated at 515° C. to complete the fabrication of the MIG head shown in FIG. 2. Mn—Zn single crystal ferrite was used as the ferrite constituting the magnetic core halves 8 and 9 a film of Fe—Ta—N having a saturation magnetic flux density (Bs) of 1.6 T was used as the magnetic metal films 10 and 11, and fused silica was used as the magnetic gap material 12.

The fabricated MIG head produced no crack or fracture, and no erosion or the like was observed in the sealing glass portion, thereby exhibiting a desired magnetic transducing characteristic.

EXAMPLE 33

Figure 3:
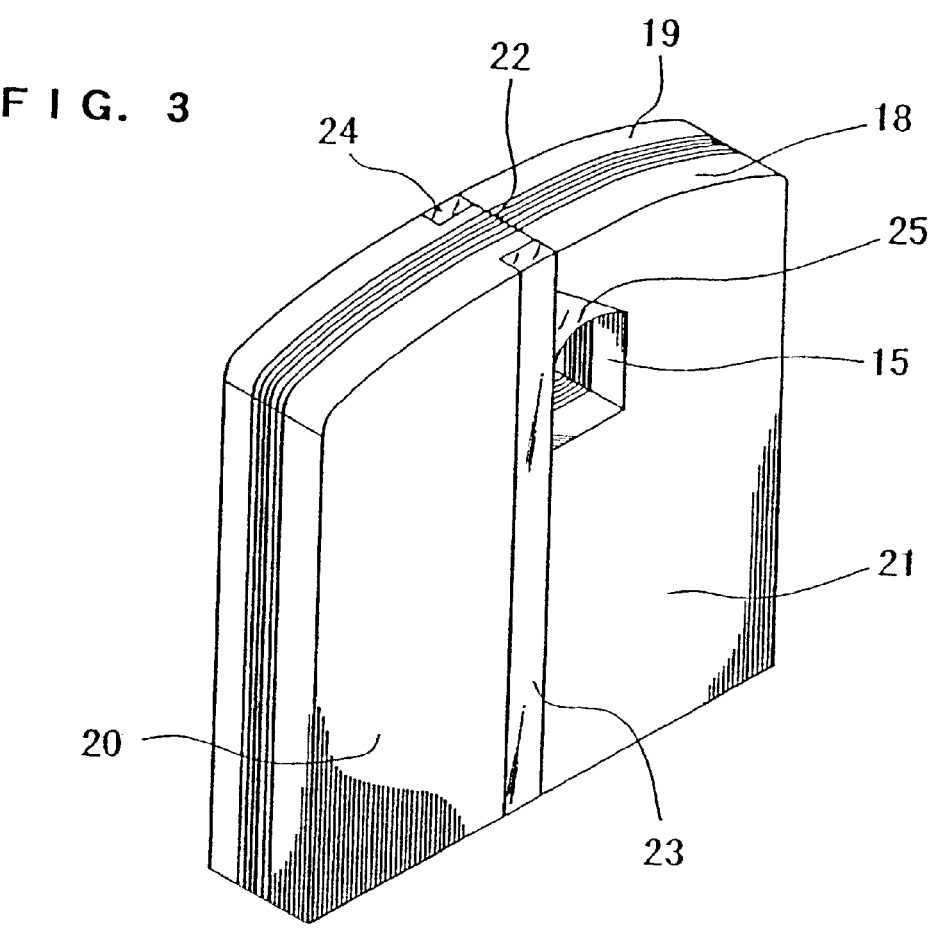
FIG. 3 is a perspective view of a laminated head as one example in accordance with the present invention.
Figure 4:
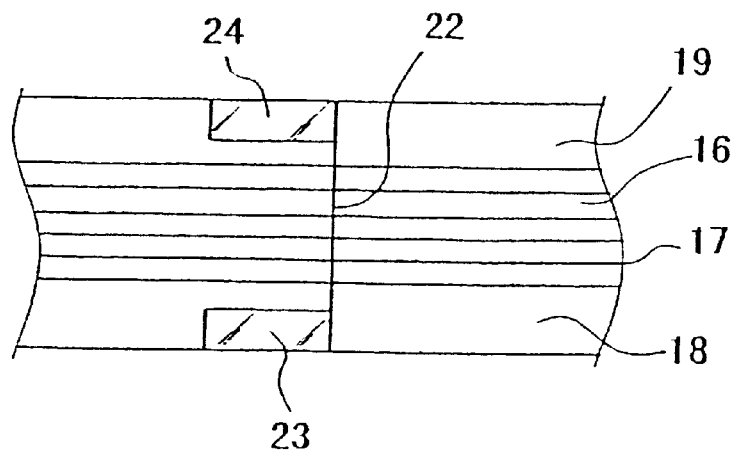
FIG. 4 is a top plan view of a relevant part of the magnetic head shown in FIG. 3.

FIGS. 3 and 4 show an example of a laminated head as one example of a magnetic head in accordance with the present invention. FIG. 3 is a perspective view of another example of a magnetic head in accordance with the present invention. FIG. 4 is a top plan view of a relevant part of the magnetic head shown in FIG. 3.

A magnetic core half 21, which was provided with a groove 15 for a coil and constituted by sandwiching a laminated body of a magnetic metal film 16 and an insulating film 17 between non-magnetic substrates 18 and 19, and a magnetic core half 20, which was constituted by sandwiching the same laminated body as above between non-magnetic substrates, were butted against each other with a magnetic gap material 22 interposed therebetween, and bonded together with sealing glasses 23, 24 and 25.

The glass composition 9 of the above example was used as the sealing glasses 23, 24 and 25, each of which was heat-treated at 495° C. to complete the fabrication of the laminated head shown in FIG. 3. A Co—Ta—Zr—Nb alloy having a saturation magnetic flux density (Bs) of 0.8 T was used as the magnetic metal film 16, and fused silica was used as the insulating film 17. Also, a ceramic substrate of MgO—NiO—$TiO_2$ was used as the non-magnetic substrates 18 and 19, and fused silica was used as the magnetic gap material 22.

The fabricated laminated head produced no crack or fracture, and no erosion or the like was observed in the sealing glass portion, thereby exhibiting a desired magnetic transducing characteristic.

It should be noted that any conventionally used material could basically be used as the magnetic core, magnetic metal film, magnetic gap material, insulating film, non-magnetic substrate and the like in each of the above ferrite head, MIG head and laminated head.

Additionally, the sealing glass for a magnetic head in accordance with the present invention could also be used for any other magnetic head having a structure other than those of the above-described magnetic heads.

Industrial Applicability

As described above, the present invention provides a glass material having a low softening point and an excellent water resistance despite being lead-free, and thus it provides a bonding material, sealing material, coating material for various materials such as ceramics, glass and metal, as well as a paste material having various functions.

Consequently, a sealing glass for a magnetic head in accordance with the present invention has the property of having a low softening point and an excellent water resistance despite being lead-free.

Therefore, the use of a sealing glass for a magnetic head in accordance with the present invention provides magnetic heads such as a ferrite head, MIG head and laminated head, each exhibiting high performance and high reliability.

What is claimed is:

1. A glass composition containing 0.5 to 14 wt % of $SiO_2$, 3 to 15 wt % of $B_2O_3$, 4 to 22 wt % of ZnO, 55 to 90 wt % of $Bi_2O_3$, 0 to 4 wt % of $Al_2O_3$, 0 to 5 wt % of at least one selected from the group consisting of $Li_2O$, $Na_2O$ and $K_2O$, and 0 to 15 wt % of at least one selected from the group consisting of MgO, CaO, SrO and BaO, wherein the ratio of $ZnO/B_2O_3$ is 0.8 to 2.8 and the ratio of $SiO_2/Al_2O_3$ is not less than 2 and wherein the weight loss per unit area of the composition is not more than 1.0 mg/cm².

2. The magnetic head of claim 1, wherein the composition comprises at least one $Li_2O$, $Na_2O$ and $K_2O$ of up to 5 wt %.

3. A sealing glass for a magnetic head having a composition containing 0.5 to 14 wt % of $SiO_2$, 3 to 15 wt % of $B_2O_3$, 4 to 22 wt % of ZnO, 55 to 90 wt % of $Bi_2O_3$, 0 to 4 wt % of $Al_2O_3$, 0 to 5 wt % of at least one selected from the group consisting of $Li_2O$, $Na_2O$ and $K_2O$, and 0 to 15 wt % of at least one selected from the group consisting of MgO, CaO, SrO and BaO, wherein the ratio of $ZnO/B_2O_3$ is 0.8 to 2.8 and the ratio of $SiO_2/Al_2O_3$ is not less than 2 and wherein the weight loss per unit area of the composition is not more than 1.0 mg/cm².

4. The magnetic head of claim 3, wherein the composition comprises at least one $Li_2O$, $Na_2O$ and $K_2O$ of up to 5 wt %.

5. A magnetic head comprising:

a pair of magnetic core halves butted against each other with a magnetic gap material interposed therebetween, at least one of which being provided with a groove for a coil; and sealing glass for a magnetic head that bonds said core halves together, wherein said sealing glass has a composition containing 0.5 to 14 wt % of $SiO_2$, 3 to 15 wt % of $B_2O_3$, 4 to 22 wt % of ZnO, 55 to 90 wt % of $Bi_2O_3$, 0 to 4 wt % of $Al_2O_3$, 0 to 5 wt % of at least one selected from the group consisting of $Li_2O$, $Na_2O$ and $K_2O$, and 0 to 15 wt % of at least one selected from the group consisting of MgO, CaO, SrO and BaO, wherein the ratio of $ZnO/B_2O_3$ is 0.8 to 2.8 and the ratio of $SiO_2/Al_2O_3$ is not less than 2 and wherein the weight loss per unit area of the composition is not more than 1.0 mg/cm².

6. The magnetic head of claim 5, wherein the composition comprises at least one $Li_2O$, $Na_2O$ and $K_2O$ of up to 5 wt %.

7. A magnetic head comprising:

a pair of magnetic core halves butted against each other with a magnetic gap material interposed therebetween at gap-facing surfaces of said core halves, at least one of which being provided with a groove for a coil and at least one of which being formed with a magnetic metal film on said gap-facing surface; and a sealing glass for a magnetic head that bonds said core halves together, wherein said sealing glass has a composition containing 0.5 to 14 wt % of $SiO_2$, 3 to 15 wt % of $B_2O_3$, 4 to 22 wt % of ZnO, 55 to 90 wt % of $Bi_2O_3$, 0 to 4 wt % of $Al_2O_3$, 0 to 5 wt % of at least one selected from the group consisting of $Li_2O$, $Na_2O$ and $K_2O$, and 0 to 15 wt % of at least one selected from the group consisting of MgO, CaO, SrO and BaO, wherein the ratio of $ZnO/B_2O_3$ is 0.8 to 2.8 and the ratio of $SiO_2/Al_2O_3$ is not less than 2 and wherein the weight loss per unit area of the composition is not more than 1.0 mg/cm².

8. The magnetic head of claim 7, wherein the composition comprises at least one $Li_2O$, $Na_2O$ and $K_2O$ of up to 5 wt %.

9. A magnetic head comprising:

a pair of magnetic core halves butted against each other with a magnetic gap material interposed therebetween at ends of magnetic metal films of said core halves, each of which being constituted by sandwiching said magnetic metal film between non-magnetic substrates and at least one of which being provided with a groove for a coil; and a sealing glass for a magnetic head that bonds said core halves together, wherein said sealing glass has a composition containing 0.5 to 14 wt % of $SiO_2$, 3 to 15 wt % of $B_2O_3$, 4 to 22 wt % of ZnO, 55 to 90 wt % of $Bi_2O_3$, 0 to 4 wt % of $Al_2O_3$, 0 to 5 wt % of at least one selected from the group consisting of $Li_2O$, $Na_2O$, and 0 to 15 wt % of at least one selected from the group consisting of MgO, CaO, SrO and BaO, wherein the ratio of $ZnO/B_2O_3$ is 0.8 to 2.8 and the ratio of $SiO_2/Al_2O_3$ is not less than 2 and wherein the weight loss per unit area of the composition is not more than 1.0 $mg/cm^2$.

10. The magnetic head of claim 9, wherein the composition comprises at least one $Li_2O$, $Na_2O$ and $K_2O$ of up to 5 wt %.

* * * * *

UNITED STATES PATENT AND TRADEMARK OFFICE
CERTIFICATE OF CORRECTION

PATENT NO.    : 6,778,355 B2
DATED         : August 17, 2004
INVENTOR(S)   : Shinya Hasegawa et al.

It is certified that error appears in the above-identified patent and that said Letters Patent is hereby corrected as shown below:

Column 10,
Line 11, change "The magnetic head" to -- The glass composition --
Line 20, change "A1-$_2$0$_3$" to -- A1$_2$0$_3$ --
Line 23, change "The magnetic head" to -- The sealing glass --

Column 12,
Line 1, after the word "and" insert -- K$_2$0, and --

Signed and Sealed this

First Day of March, 2005

JON W. DUDAS
*Director of the United States Patent and Trademark Office*